Aug. 20, 1935.  W. J. McGOLDRICK  2,012,068
THERMOSTATIC VALVE
Filed June 9, 1932  2 Sheets-Sheet 1
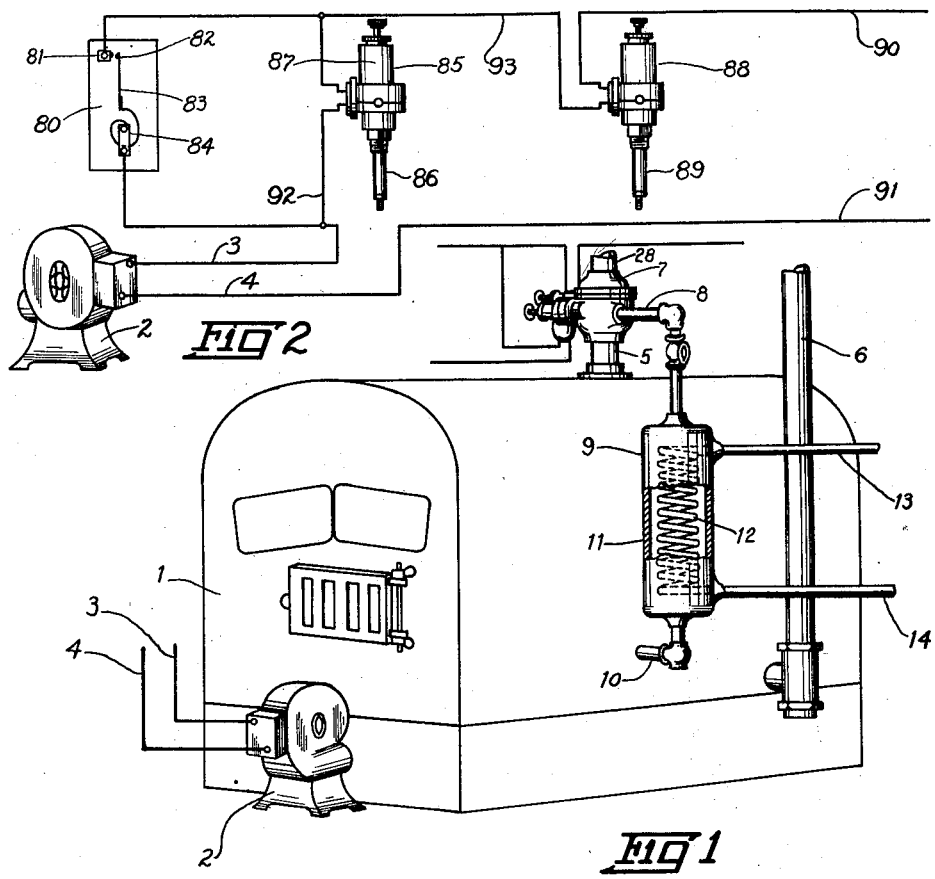
INVENTOR.
William J. McGoldrick.
BY
Sleugh and Caufield
ATTORNEY.

Aug. 20, 1935.  W. J. McGOLDRICK  2,012,068
THERMOSTATIC VALVE
Filed June 9, 1932   2 Sheets-Sheet 2

INVENTOR.
William J. McGoldrick.
BY
Slingland Caufield
ATTORNEY.

Patented Aug. 20, 1935

2,012,068

UNITED STATES PATENT OFFICE 2,012,068

THERMOSTATIC VALVE

William J. McGoldrick, Watertown, Mass., assignor to The Bishop & Babcock Mfg. Company, Cleveland, Ohio, a corporation of Ohio Application June 9, 1932, Serial No. 616,344

11 Claims. (Cl. 236—93)

This invention relates to automatically controlled heating systems and particularly to such heating systems as are employed to heat the interior of buildings.

My invention has particular advantages when applied to heating systems in which steam or circulating hot water is employed as a heating medium and in which heat is supplied to the water or steam by an automatic electrically controlled fuel burning apparatus.

In connection with hot water or steam heating systems, it is desirable to provide a constant supply of hot water for use at faucets, such as faucets in bathrooms, lavatories, etc., and to maintain the same at a desirable temperature above a predetermined minimum temperature, irrespective of the heat demands upon the system for heating the rooms of the building.

Thus, for example, in winter hot water is wanted at the faucets and heat is also wanted in the rooms in the room heating radiators, whereas in summer hot water is wanted only at the faucet; and in spring and autumn, besides hot water at the faucet, heat may be wanted intermittently or occasionally in the radiators.

Heretofore, various relatively simple and economical apparatus and control means therefor have been proposed for providing hot water for faucets or domestic purposes in conjunction with a radiator heating system where the system has been a steam system or a vacuum vapor system. However, where hot water has been used as the heating medium, the first cost of suitable control devices and the installation has rendered such systems prohibitively expensive for providing heat both for the radiators and for faucet hot water purposes.

With the increasing popularity of hot water heat, there has been an increasing demand for apparatus and controls therefor for furnishing hot faucet water and which would not be prohibitive in cost. It is becoming more and more general practice, following the advent of automatic fuel fed boilers such as oil, gas, and stoker-fed boilers, to heat the boiler summer and winter and to employ an indirect water heater in conjunction with the boiler and suitable controls therefor, to provide the hot water for faucet or domestic purposes.

It is therefore an object of this invention to provide a hot water heating system automatically controlled to provide hot water for faucet purposes at all times, winter and summer, at a substantially constant temperature, and automatically supply hot water to the room heating radiators only when necessary to maintain the rooms at a predetermined temperature.

Another object is to provide such a system in which the temperature of the faucet water may be automatically thermostatically controlled in an improved manner.

Another object is to provide such a system in which the supply of hot water to the radiators may be controlled in an improved manner responsive to temperature changes of the rooms to be heated.

Another object is to provide a hot water heating system in which the fuel supply apparatus for a water heating boiler may be controlled automatically in a manner to maintain a supply of hot water in the boiler at all times, sufficient to heat a supply of faucet water and to maintain the same at a desired temperature and which supply of hot boiler water may automatically be admitted to the room heating radiators and circulated therein upon a thermostatic demand for higher temperature in the rooms to be heated.

Another object is to provide in connection with a water boiler and heat supplying apparatus therefor and indirect heating means for heating a supply of faucet water, improved means for controlling the supply of fuel to the boiler.

Another object is to provide a hot water heating system automatically controlled to provide hot water for faucet purposes at all times at a substantially constant temperature, and automatically supply hot water to the room heating radiator when necessary to maintain the room at a predetermined temperature, which is uninfluenced by variations in the head of water maintained in the system.

Another object is to provide in connection with an automatically controlled hot water heating system adapted to provide hot water for faucet purposes and for room heating radiators, a means for maintaining the rooms at a predetermined temperature which will maintain a supply of hot water to the radiators irrespective of breakage or derangement of the normal operation of the system.

Other objects of my invention will be apparent to those skilled in the art to which my invention appertains.

My invention is fully disclosed in the following description taken in connection with the accompanying drawings in which,—

Fig. 1 is a view illustrating a form of my invention applied to the boiler of a heating system of a type having a single circulating riser and return pipe and having an electrically actuated and controlled fuel supply apparatus;

Fig. 2 is a diagram illustrating one form of an electric control circuit which I may employ in connection with the boiler and fuel supplying apparatus of Fig. 1;

Figure 4:
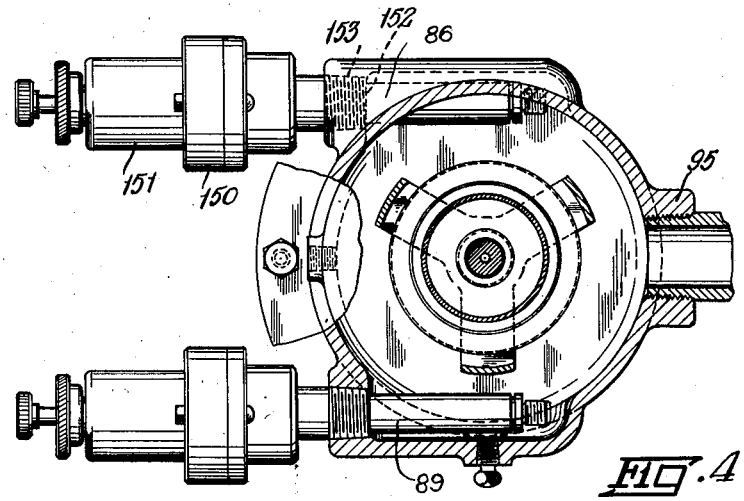
Fig. 4 is a horizontal sectional view taken from plane 4—4 of Fig. 3.

I contemplate that the valve device as hereinafter described and claimed may be incorporated in other systems than that illustrated herein, the system illustrated being generally similar to that described and claimed in a co-pending application of Edward Levy Mayo, Serial No. 616,275, filed June 9, 1932, for Automatically controlled heating systems.

Referring to the drawings, I have shown at 1 a boiler and at 2, generally, a part of an automatic fuel supplying apparatus for heating the boiler. The part 2 is shown generally in the form of a blower for supplying air for combustion purposes within the boiler and the other operative parts of the fuel supplying apparatus are not shown, being concealed within the base of the boiler. The part 2 therefore may represent a fuel supplying apparatus of any type suitable to automatically supply fuel to the boiler such for example as an oil burner, gas burner, coal stoker, coal blower, etc., and inasmuch as all such apparatus is well known in this art, it is believed unnecessary to describe the same in detail.

The control of such automatic firing apparatus is commonly effected by an electric circuit leading thereto and which in Fig. 1 is illustrated by the circuit wires 3 and 4. In other words, electric current flowing over the wires 3 and 4 to the apparatus 2 will cause the same to supply fuel to the boiler and heat the same in any of the several well known types of apparatus and modes of operation thereof.

However, I contemplate that the control of the boiler firing apparatus may be effected by other means than an electric circuit such as controlling a gravity operated oil burner or a burner controlled by throttling of the fuel supply wherein the burner is continuously operated and a temperature responsive bellows or the like effects the throttling action.

The boiler 1 is of a type suitable to supply hot water to room heating radiators and therefore has leading upwardly from the top of the boiler a riser 5 through which hot water in the boiler may circulate to heat radiators; and the circulating water from the radiators may flow back to the boiler by a return pipe 6 in a well known manner.

Immediately above the boiler and in the line of the riser 5, I provide a thermostatically operated valve device shown generally at 7, the construction and operation of which will presently be described.

Leading from the riser 5, is a conduit 8 communicating with an indirect water heater 9 from which a return conduit 10 leads back to the boiler. The indirect water heater 9 may be of any suitable or known construction.

One such known indirect water heater comprises a shell 11, through which a coil 12 extends communicating with the conduits 8 and 10. Hot water from the boiler therefore, may circulate through the coil 12. Water in the shell 11 surrounding the coil 12 will therefore be heated and by means of conduits 13 and 14 connected to a hot water supply tank may heat the water in the tank, the water circulating through the conduits 12 and 14 and shell 11 and storing up hot water in the supply tank in a well known manner.

Figure 3:
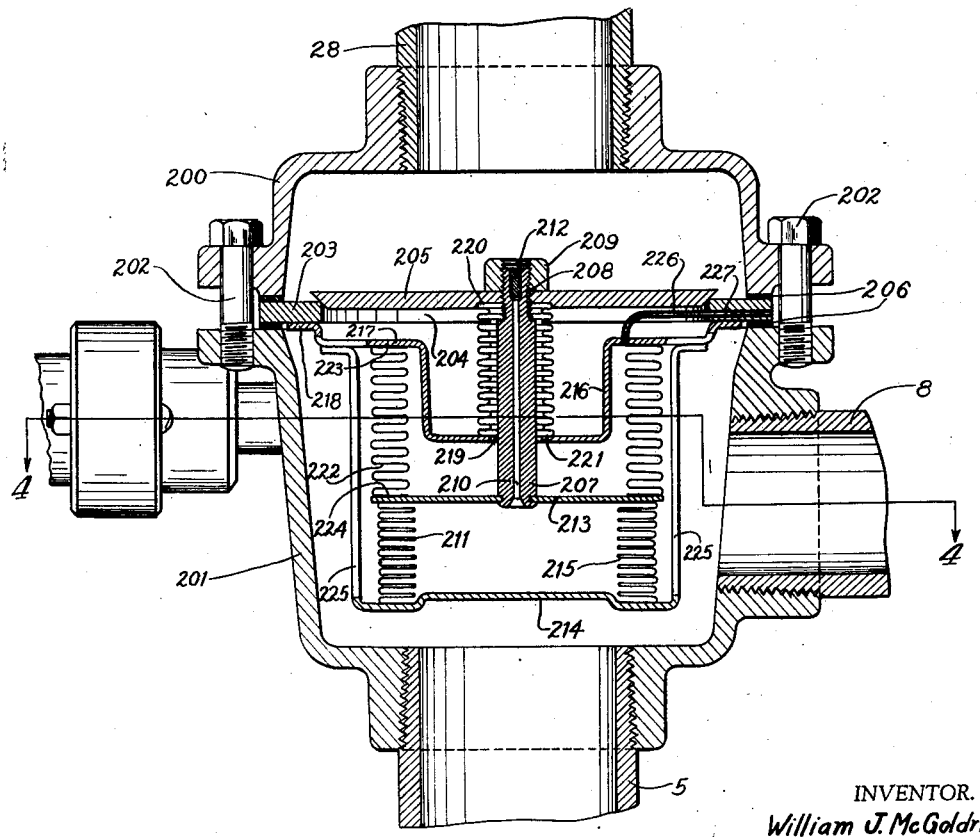
Fig. 3 is an elevational sectional view of a thermostatically operated valve device which I may employ having hydraulic pressure balanced features.

In Fig. 3 I have illustrated a preferred construction of thermostatic valve device. In this form, an upper and a lower cup-form housing element 200 and 201 respectively are clamped together by bolts 202 upon a partition 203 having a valve port 204 therein upon which is seated a valve 205, the valve port element 203 being sealed between the housing elements by sealing washers 206—206.

A stem 207 is threaded as at 208 through a threaded perforation in the valve 205 for adjusting the stem 207 axially and the adjustment may be fixed by a nut 209 on the stem. A duct 210 extending axially through the stem communicates with the interior of a bellows 211 whereby thermally expansible fluid may be injected into the bellows and thereafter the ducts sealed as by a plug 212. The bellows 211 comprises an upper head 213 rigidly and sealedly connected to the lower end of the stem 207, and a lower head 214 axially spaced from the head 213, and the two heads 213 and 214 are connected sealedly to opposite ends of a collapsible bellows wall 215.

A cup-shaped frame element 216 having an outwardly radially extending flange 217 at the open end of the cup, is connected to the valve port element 203 by arms 218. The bottom of the cup element 216 is perforated as at 219, the perforation surrounding the stem 207, and a sealing bellows of the corrugated type extends from the cup bottom to the lower side of the valve 205 and is sealingly secured thereto respectively as at 220, and 221.

A hydraulic fluid pressure bellows of the cylindrical corrugated type 222 is sealedly connected at one end as at 223 to the flange 217 of the cup-form element and at the opposite end as at 224 to the head 213.

The lowermost head 214 is connected as by bracket arms 225—225 to the arms 218 and thence to the element 203.

A small pipe 226 effects a communication between the interior of the bellows 222 and the atmosphere, being sealed at one end in an aperture in the flange 217, and at the other end projecting through a suitable bore at 227 in the valve port element 203 and sealed therein.

Thermostatic switch immersion elements 86 and 89 are illustrated as disposed in the housing element 201 and may be supported therein in connection with thermostatic switch devices such as 85 and 88 and the mounting thereof is illustrated in Fig. 4.

Referring to Figs. 1 and 2 and also Figs. 3 and 4 as more specifically illustrating the thermostatically operated valve device, shown generally at 7 in Fig. 1, the operation of the system will now be explained.

When the heat demands upon the system are only for a supply of faucet hot water, the automatic fuel firing apparatus will be controlled so as to heat the water in the boiler only to a maximum temperature of say 160° in a manner to be more fully described. Thermostatic bellows 211 is constructed and adjusted so that up to a temperature 160° the valve 205 will be maintained on its seat to close the port 29 therethrough; and the hot water therefore will circulate only through the indirect heater 9. If, however, the heat demands of the system require that heat be supplied through the riser 5 to heat radiators, the automatic control of the firing apparatus will heat the water in the boiler and therefore in the casing 201 to a temperature above 160°, and thereupon the bellows device 211 will expand axially and open the valve 205 and the hot water from the boiler will at once begin to circulate, upwardly through the housing portion 200 and out through the riser 28 and thence to the radiators to supply heat thereto.

The bellows device 222 is uninfluenced by temperature its interior being at all times at atmospheric pressure and its function is to balance the effect of hydraulic heads upon the bellows device 211. Since the riser 28 may lead to radiators of considerable variation in height above the boiler even in private residences, hydraulic pressure in the housing 201 and therefore on the bellows 211 may be considerable and will tend to counteract the expansion of the bellows thermostatically. The bellows 222, however, is subjected to the same hydraulic pressure and any tendency to collapse is counter balanced by the tendency of the bellows 211 to collapse, the bellows 211 exerting an upward thrust on the base 213 and the bellows 222 exerting a downward thrust on the valve 205 and both the base and the valve being rigidly secured together, by the valve stem 207.

The spring 54 together with the expansion of the volatile filling of bellows 211 exerted sufficient pressure axially and upwardly at a temperature of substantially 160° to lift the valve 205 from the seat and permit the circulation of hot water through the ports. However, it is necessary to ensure that if the volatile filling within the bellows should escape for any reason and thereby lessen the pressure within the bellows, that the valve 205 will be opened to provide a supply of heated water to the radiators. Otherwise, the valve would not open regardless of the temperature of the water within the housing 201 and irrespective of the temperature of the rooms. The spring 54 acts as a positive means for forcing the valve 205 to an open position if the volatile filling should escape from the bellows 211, thus providing a safety feature preventing undue lowering of the temperature in the room and consequent danger to health and equipment. The pressure within bellows 211 if leakage should occur, will, obviously eventually become equal to the hydraulic pressure exteriorly thereof in the housing 201 which will be exerting an upward thrust on valve 205 in addition to the spring.

If the pressure bellows 222 should leak so that the bellows would fully or partially fill with water to replace all or a portion of the air within the bellows, it would be subjected interiorly, only to atmospheric pressure. Therefore, as the valve 205 was raised upwardly it would force water from the bellows through the tube 226 against atmospheric pressure. It will thus be seen that the construction of the device is such that irrespective of a leak in either the thermostatic bellows or the pressure bellows that the valve will be forced open.

The control of the boiler to maintain temperature of the water therein at or below a maximum temperature of say 160° when water for the indirect heater of the faucet water supply tank only is needed, and to raise the temperature of the water in the boiler to effect opening of the thermostatic valve and to circulate same through the heating radiators when a need for heat arises in the rooms to be heated, will now be described.

Referring to Fig. 2, I have shown generally at 80 a room thermostat comprising a stationary contact 81 and a movable contact 82, the latter being carried by a movable arm 83 which is connected to a thermostatic element 84. Upon changes of surrounding room temperature, the thermostatic element 84 will effect a movement of the contact 82 to engage the contact 81 or to disengage the same in a well known manner.

Generally at 85 I have illustrated a thermostat of the so-called immersion type, that is to say, a thermostatic device having a generally tubular element 86 adapted to be inserted or immersed into a fluid, in the case under consideration this being hot water, the temperature of which is to actuate the device. Within a housing 87, an electric switch is provided adapted to have its contacts closed when the temperature of the water on the element 86 falls to a predetermined value and vice versa.

At 88 is indicated another thermostatic device of the immersion type which may be identical with or similar to the device 85.

An electric circuit is provided adapted to be connected to a source of current by mains 90 and 91. Current from the main 91 may flow through the contact of the thermostatic device 88 and thence by wires 92 and 93, respectively, through the thermostats 80 and 85 in parallel with each other; and the current may then flow by wires 3 and 4 to the apparatus 2 and to the other supply main 90.

The thermostat 80 is situated in a room to which heat is to be supplied. The thermostat 85 has its immersion element 86, as shown generally in Figs. 3 and 4, disposed in the housing portion 201 adjacent the thermostatic bellows 211; and the thermostatic device 88 has its immersion element 89 disposed in the same housing portion, and thus both thermostats are subjected to the temperature of water in the said housing portion.

The thermostat 85 is adjusted so that it will operate to open its contacts when the water temperature on its element 86 reaches 160°. The thermostatic device 88 is, however, adjusted so that it will open its contacts at some suitable temperature above 160°, such, for example, as 170°, a 10° differential being preferred as thus indicated.

In the operation of the system, therefore, if as in the summer time the rooms to be heated do not demand heat, the thermostat 80 will open its contacts to shut down the fuel supplying apparatus 2, but the contacts of the thermostat 85 will remain closed and thus actuate the apparatus 2 to keep the water heated up to but not beyond 160°; whereby it will supply heat to the indirect faucet water heater 9. If, however, the water rises in temperature above 160°, the thermostatic device 85 will open its contacts, and the contacts of the thermostat 80 being open, the apparatus 2 will completely shut down. If the temperature of the boiler water falls below 160°, or a predetermined differential amount below 160°, the contacts of the device 85 will close and start up the apparatus 2 to restore the boiler water temperature.

Thus the device 85 will maintain the boiler water at a suitable temperature to heat the faucet water tank. If, however, the room temperature should fall, it will close the contacts of the device 80 and this will actuate the apparatus 2 irrespective of the thermostat 85 and even if the latter opens its contacts, fuel will continue to be supplied to increase the temperature of the boiler water beyond 160° specified. The water will thus continue to increase in temperature until it reaches, say, the temperature of 170° to which the bellows thermostat 211 is adjusted whereupon the thermostat will open the valve 205 and the hot water will begin to circulate through the radiators to raise the temperature of the room. If the room is slow to heat up and the boiler temperature continues to increase or over-run, the desired temperature at which, after the room once becomes warm, it may be kept warm, such temperature will operate the thermostat 88 to open its contacts and shut down the apparatus 2 irrespective of the circuit conditions in the thermostat 80.

Thus the thermostat 88 will limit the maximum temperature of the boiler water under all conditions to a predetermined maximum and the thermostats 80 and 85 will, one or the other, heat the boiler water hot, the thermostat 85 keeping it up to but not beyond 160° and the thermostat 80 raising it above 160° whenever this is necessary to maintain room temperature. The device of Figs. 3 and 4 will shut off the circulation of hot water to the radiators and limit the circulation to the indirect heater by closure of the valve 205 when the room heat demand ceases.

The thermostatic devices 85 and 88 may, as stated, be of any suitable construction comprising an immersion element 86 or 92 which may be inserted into the boiler water and comprising switch contacts which will be opened when the temperature reaches predetermined adjusted values. One such thermostatic switch device is illustrated in the pending application of C. W. Bondurant, Serial No. 515,262, filed February 12, 1921, for improvements in thermostatic switches.

The preferred construction of thermostatic switch devices 85 and 88 comprises a hollow tube-like bulb element or immersion element 92 containing thermostatically expansible fluid extending from a housing 150 comprising an electric switch enclosing chamber 151. The housing 150 may be provided with screw-threads 152 adjacent the juncture of the immersion element and the housing whereby the device as a whole may be mounted on the lower housing 201 of the thermostatic valve device 7, a suitably internally threaded aperture 153 being provided in the wall of the housing. When the threads 152 are thus screwed into the threads 153, the immersion element 89 is supported on the housing spaced from the wall thereof whereby hot water may circulate around the same and communicate its temperature thereto; and the threaded aperture 153 is sealed against the escape of water and the housing 150 containing the switch element is supported upon the device 7.

Within the housing 150 and 151, means responsive to pressure created in the immersion element 92 by a rise of temperature therein may operate the switch contacts to open an electric circuit as and for the purposes described.

Referring again to Figs. 3 and 4, I have indicated at 95 the connection from the housing 201 to the conduit 8 leading to the indirect water heater; and a manually operable petcock may be provided whereby any accumulation of air in the valve apparatus may be discharged to the atmosphere, such means being well known in the art and for this reason not being illustrated in the drawings.

The riser elements 5 and 28 may be connected to the housings 201 and 200, respectively, as indicated; and a connection 8 to an indirect water heater may be provided as in the other form.

In the operation of the form illustrated in Fig. 3, the thermostatic bellows 211 is subjected to the heat of water in the housing member 201 and when a predetermined temperature is reached, expands and causes upward movement of the head 213, carrying with it the stem 207 and the valve 205 to open the port 204.

In this form of my invention, the bellows 211 is not subjected to the hydraulic pressure of fluid in the housings 200—201, except laterally and the effect of lateral hydraulic pressure may be neglected. To subject the bellows 211 to the collapsing effect of hydraulic pressure, it would, in the construction under consideration, have to act upon the head 213, but the water is sealed from this head by the bellows 222, and the bellows 222 itself is not collapsible by the hydraulic pressure, its upper end 217 being rigidly supported and sealed at 217, and the interior of the bellows 222 being sealed against admission of the water thereto by the sealing bellows 227.

The operation of the form of Fig. 3 in connection with the other elements of the system will be understood from the more complete description of the other form.

In connection with the form of the thermostatically operated valve device of Fig. 3, it will be observed that the boiler water continuously circulates through the indirect heater so that the water in the valve device is maintained at the temperature of the water in the boiler and so that the thermostat of the thermostatically operated device 7, for example, is always subjected to the boiler water temperature even when the valve is closed and flow through the riser is shut off. Thus the conduit system to the indirect water heater performs an additional function to that of merely supplying heat to the heater, namely, the function of communicating to the thermostat in the riser the temperature of the water in the boiler.

In the absence of such a local circulating system, it will be understood that the water in the boiler might attain a temperature many degrees different from that in the riser when the riser valve is closed.

Although I have described embodiments of my invention, I contemplate that numerous and extensive departures may be made therefrom without departing from the spirit and scope of my invention and the appended claims.

Having thus described my invention, what I claim is:—

1. In a thermostatic valve device, a housing adapted to be connected in the line of flow of a conduit, a partition in the housing, a valve port in the partition, a valve for closing and opening the port, a thermostatic bellows containing thermally expansible fluid and axially collapsible and expansible and having a head rigidly supported on a bracket in the housing and an opposite head connected to the valve by an axially extending stem, a second axially expansible and collapsible bellows having a head rigidly connected to a bracket in the housing and having its opposite head connected to and movable with the movable head of the first bellows, the second bellows having a communication with the atmosphere externally of the housing, and the stem extending axially through the second bellows and through the stationary head thereof and sealedly movable therethrough.

2. In a thermostatic valve device, a housing adapted to be connected in the line of a liquid conduit, a valve in the housing controlling the flow, a thermostatic bellows in the housing subjected to temperature of liquid therein and expansible and contractible axially and having a transverse end wall portion connected to the valve to move it, and a second axially collapsible bellows sealed at one end to the said transverse wall portion, sealed at its opposite end, and interiorly communicating with the atmosphere and both bellows exposed laterally to the pressure of fluid head in the conduit whereby the said pressure is prevented from tending to collapse the thermostatic bellows.

3. A thermostatic valve device as described in claim 1 and in which the stem extends through a perforation in the stationary head of the second bellows, and a third axially expansible and collapsible bellows is disposed in telescopic relation to the stem, sealedly connected at one end to the said perforated head around the periphery of the perforation, and sealedly connected at the other end to the valve.

4. In a thermostatic valve device, a housing adapted to be connected in the line of flow of a liquid conduit, a valve in the housing controlling the flow, a thermostatic bellows construction in the housing comprising two bellows chambers subjected to the temperature of the liquid in the housing and to the pressure of liquid head in the conduit, the two bellows having a common movable head connected to the valve element, one bellows containing thermally expansible fluid and the other communicating interiorly with the atmosphere outside the housing, the two bellows being arranged so that upon movement of the common head one bellows may expand and the other contract.

5. In a thermostatic valve device, a frame comprising a portion adapted to be sealedly supported in a conduit means, a fluid flow passageway in the frame, a valve for closing and opening the passageway to control flow therethrough and through the conduit means, a thermostatic bellows containing thermally expansible fluid, an axially collapsible and expansible bellows having a head rigidly supported by a bracket portion of the frame, and an opposite head connected to the valve by an axially extending stem, a second axially expansible and collapsible bellows having a head rigidly connected to a bracket portion of the frame and having opposite head connected to and movable with the head of the first bellows, the second bellows having communication with the external atmosphere through said sealedly supportable frame portion and the stem extending axially through the second bellows and through the stationary head thereof and sealedly movable therethrough.

6. A thermostatic valve device as described in claim 5 and in which the stem extends through a perforation in the stationary head of the second bellows and a third axially expansible and contractible bellows is disposed in telescopic relation to the stem, sealedly connected at one end to the said perforated head around the periphery of the perforation, and sealedly connected at the other end to the valve.

7. In a thermostatic valve device, a frame comprising a portion adapted to be sealedly supported in a conduit means, a fluid flow passageway in the frame, a valve for closing and opening the passageway to control flow therethrough and through the conduit means, a thermostatic bellows construction on the frame comprising two bellows chambers having a common movable head connected to the valve, one bellows containing thermally expansible fluid and the other communicating interiorly with the external atmosphere through said sealedly supported frame portion, the two bellows being arranged so that upon movement of the common head one bellows may expand and the other contract.

8. In a thermostatic valve device, a frame comprising a portion adapted to be sealedly supported in a conduit means, a fluid flow passageway in the frame, a valve for closing and opening the passageway to control flow therethrough and through the conduit means, a thermostatic bellows on the frame having a movable wall portion connected to the valve to move it and means for preventing pressure of liquid head in the conduit means from acting on the movable wall portion in the direction to tend to collapse the bellows comprising a second bellows maintained out of collapsing pressure contact with the liquid and connected to the movable wall of the first mentioned bellows and communicating interiorly with the external atmosphere through the said sealedly supported portion of the frame.

9. In a thermostatic valve device, a frame comprising a portion adapted to be sealedly supported in a conduit means, a fluid flow passageway on the frame, a valve for closing and opening the passageway to control flow therethrough and through the conduit means, a thermostatic bellows on the frame expansible and contractible axially and having a transverse end wall portion connected to the valve to move it, and a second axially collapsible bellows sealed at one end to the said transverse wall portions, sealed at its opposite end, and interiorly communicating with the external atmosphere through the said sealedly supportable portion of the frame and both bellows exposable laterally to the pressure of fluid head in the conduit means whereby the said pressure may be prevented from tending to collapse the thermostatic bellows.

10. In a thermostatic valve device, a housing adapted to be connected in the line of flow of a liquid conduit, a valve in the housing controlling the flow, a thermostatic bellows in the housing subjected to temperature of liquid therein and having a movable wall portion connected to the valve to move it, and means preventing pressure of liquid head from acting on the movable wall portion in the direction to tend to collapse the bellows, said preventing means comprising a second bellows maintained out of collapsing pressure contact with the liquid and connected to the movable wall of the first-named bellows and communicating interiorly with the atmosphere.

11. In a thermostatic valve device, a frame adapted to be connected in the line of flow of a liquid conduit, a valve controlling the flow, a thermostat of the expansible collapsible type in the frame subjected to temperature of liquid therein and having a movable portion connected to the valve to move it, and means preventing pressure of liquid head from acting on the movable portion in the direction to tend to collapse the thermostat, said preventing means comprising a second bellows maintained out of collapsing pressure contact with the liquid and connected to the movable wall of the first-named thermostat and communicating interiorly with the atmosphere.

W. J. McGOLDRICK.